United States Patent
Barrett et al.

(10) Patent No.: US 7,124,349 B2
(45) Date of Patent: Oct. 17, 2006

(54) METHOD AND APPARATUS FOR TRANSMISSION ERROR CHARACTERIZATION

(75) Inventors: Paul Alexander Barrett, Ipswich (GB); Richard John Buchan Reynolds, Ipswich (GB); Antony William Rix, Cambridge (GB)

(73) Assignee: Psytechnics Limited, Ipswich (GB)

( * ) Notice: Subject to any disclaimer, the term of this patent is extended or adjusted under 35 U.S.C. 154(b) by 435 days.

(21) Appl. No.: 10/425,811

(22) Filed: Apr. 29, 2003

(65) Prior Publication Data

US 2003/0204794 A1 Oct. 30, 2003

(30) Foreign Application Priority Data

Apr. 30, 2002 (EP) ................... 02253029
Apr. 30, 2002 (EP) ................... 02253030
May 30, 2002 (EP) ................... 02253791

(51) Int. Cl.
*H03M 13/09* (2006.01)
*H03M 13/17* (2006.01)

(52) U.S. Cl. ...................... 714/776; 714/712
(58) Field of Classification Search ............... 714/776, 714/712, 752, 774; 375/224; 370/241
See application file for complete search history.

(56) References Cited

U.S. PATENT DOCUMENTS 5,802,105 A 9/1998 Tiedemann, Jr. et al.
5,893,035 A * 4/1999 Chen .......................... 455/522
2002/0041703 A1 * 4/2002 Fox ............................ 382/154
2003/0203719 A1 * 10/2003 Barrett et al. ............ 455/67.11

FOREIGN PATENT DOCUMENTS

| EP | 0 798 888 A2 | 10/1997 |
| EP | 1 067 730 A1 | 1/2001 |
| WO | 99/59273 | 11/1999 |
| WO | 01/78220 A1 | 10/2001 |
| WO | 01/97414 A1 | 12/2001 |

* cited by examiner

*Primary Examiner*—Albert Decady
*Assistant Examiner*—Dipakkumar Gandhi
(74) *Attorney, Agent, or Firm*—Burr & Brown (57) ABSTRACT

This invention relates to measurement of error characteristics of a communication channel. The invention is of particular use for measuring perceived transmission performance of the communication channel. The invention provides a method and apparatus for measuring the transmission error characteristics of a channel employing frame based transmission in which a frame classification indicator is generated for an expected frame, according to data received via said channel, and in which the following steps are repeatedly performed: generating frame classification data relating to the expected frame; updating a statistical representation of the transmission error characteristics according to said frame classification. The invention also provides a method and apparatus for measuring perceived transmission performance of a communications channel in which the perceived transmission performance is generated according to measured transmission error characteristics.

18 Claims, 3 Drawing Sheets

METHOD AND APPARATUS FOR TRANSMISSION ERROR CHARACTERIZATION

BACKGROUND OF THE INVENTION

This invention relates to measurement of error characteristics of a communication channel. The invention is of particular use for measuring perceived transmission performance of the communication channel.

Signals carried over telecommunications links can undergo considerable transformations, such as digitization, compression, encryption and modulation. They can also be distorted due to the effects of transmission errors. It is highly desirable to be able to determine the combined effect of such transformations and transmission errors on the quality of the received signal as perceived by a human.

The present invention is concerned with channels employing transport of frames of data. Packet based communication systems such as the Internet Protocol (IP) defined in Internet Engineering Task Force (IETF) request for comment (RFC) number 791 are a good example of a frame based communication system. Packet systems typically comprise a number of routing nodes that buffer data prior to forwarding packets towards their final destination. A feature of such networks is that the time taken for packets to transit the network is not constant because the buffering delay at each node depends upon its instantaneous load level. This variation in packet transit times is often called jitter. In a complex packet system, such as a wide area network (WAN), individual packets belonging to a media stream may take different routes, and hence packets may arrive at their destination in a different order.

The most common form of transmission error in packet networks is packet loss, which occurs when a packet is discarded at the final receiver or at an intermediate routing node. In general, a packet is discarded because:
  transmission errors have been detected in the contents of the packet;
  a buffer is full and the packet cannot be stored;
  the packet has arrived too late to be of use;

Packet systems that transport real-time data such as speech, audio and video streams often employ a protocol to compensate for the effects of variable transmission delay, packet reordering and packet loss. A good example is the real-time transport protocol (RTP) defined in IETF RFC number 1189. RTP is intended to be operated over an IP network using the user datagram protocol (UDP) defined in IETF RFC number 768. In addition to the encoded media data, RTP packets include a sequence number and a timestamp—the sequence number facilitates the reordering of packets that arrive out of order, the identification of late packets and the detection of missing packets; the timestamp is used to buffer packets at the receiver such that the net transmission delay is constant. The buffer at the receiver is sometimes referred to as a jitter buffer. The additional delay introduced by the jitter buffer is a trade-off between minimising the overall delay of the communication channel and minimising the number of packets discarded due to late arrival. In some schemes, the buffering delay can be changed adaptively to match changes in jitter statistics. In an IP communication system, the detection of transmission errors in packets is often performed by the link layer, for example ethernet.

In a typical implementation, frames of data extracted from packets in the jitter buffer are passed to a signal decoder in the order in which they were originally generated by a signal encoder. If a frame of data is missing due to a lost or late packet, this is indicated to the signal decoder by means of frame classification data. In its most simple form, the frame classification may be a binary flag indicating whether valid data is available or not. If a packet containing multiple frames of data is lost, all of the corresponding frames will be marked as being unavailable.

In the event of missing data, the signal decoder will typically produce an output signal with a duration corresponding to the missing input data. This is necessary to keep the delay across the communication channel constant. One solution to lost packets in a speech system is to mute the output of the signal decoder for the period corresponding to the missing data. A more effective solution frequently used in code excited linear predictor (CELP) speech decoders is to repeat the last known value of parameters that are known to change slowly, such as pitch and linear predictor coefficients, and to synthesise random values for the other parameters, such as the stochastic codebook index. A strategy used in video decoders it to simply freeze the output. Such techniques are commonly called error concealment in the art.

In a radio system employing frame based transmission, symbol errors may occur when a transmitted symbol is incorrectly decoded by a receiver. Many transmission schemes include forward error correction (FEC) techniques that allow a limited number of transmission errors to be corrected. The symbol errors that are introduced by the transmission link are commonly called raw errors, whilst errors that remain after the application of FEC decoding are commonly called residual errors. If there is no FEC then the residual errors are equivalent to the raw errors.

Bad frames are frames of data that contain symbol errors that have been detected, but not corrected. The error detection mechanism may be a by-product of an FEC scheme or the result of a specific checksum calculation. In some schemes, a frame of data is classified as bad if an error is detected in any symbol position. In other schemes, a frame is only classified as bad if errors are detected in particular symbol positions within the frame. This latter technique is often used in unequal error protection (UEP) transmission schemes.

UEP is frequently employed in speech or video transmission systems where the contribution of a symbol to the perceived quality of the transmission depends upon its position within a frame. The error protection scheme is said to be unequal if more powerful FEC is applied to the most important symbol positions at the expense of weaker protection of less important symbol positions. Groups of symbols that receive the same level of FEC are said to belong to the same symbol class. UEP schemes typically only provide a checksum for the most important symbols, and hence only those frames received with a residual error in one or more of the most important symbol positions are classified as bad frames. This approach has been found to yield better overall transmission quality in systems where the presence of residual errors in the least important symbols is, on average, less deleterious than the effect of discarding every frame that contains one or more residual errors. A good example of such a UEP scheme is that specified for the global system for mobile communications (GSM) adaptive multi-rate (AMR) speech service in European Telecommunications Standardisation Institute (ETSI) technical specification GSM 05.03.

For any checksum, there is a finite probability that the checksum will be valid for a corrupted frame. For very short checksum lengths, this probability can become significant and undetected bad frames can become a problem. In this situation, it is common to implement additional bad frame detection techniques—many examples being based on the internal variables of a Viterbi FEC decoder. Such additional checks only indicate the probability that a frame is corrupted, and may therefore be classified differently to an invalid checksum. In a variation of bad frame classification, the AMR speech service described in the ETSI GSM specifications provides a class for frames with uncorrupted Class 1 bits (the most important bits) and the possibility of errors in the Class 2 bits (which are not protected by the checksum).

Bad frames in a radio system may be handled in much the same way as described for the packet based system described above.

Variable rate coding is a known form of signal coding whereby the encoding rate can be changed on a frame-by-frame basis. The rate may be changed according to characteristics of the input signal or due to knowledge of the capacity of the transmission network. In a variable rate communication system, the data passed to the signal decoder may therefore have a multi-level frame classification that includes an indication of the rate at which the data was encoded.

Layered or embedded coding is a known form of signal coding whereby encoded data is divided into so-called 'core data' and 'enhancement data'. The core data is the minimum information required to generate an output frame at the decoder without using error concealment techniques. The enhancement data is used to improve the perceived quality of the decoded signal, if available. The advantage of layered coding is that enhancement information can be sent in packets marked as being lower priority than packets containing core information. During periods of congestion, routing nodes can discard the lower priority enhancement packets to reduce the number of lost core packets. In a layered communication system, the data passed to the signal decoder may therefore have a multi-level frame classification that indicates which layers (or types of data) are available (if any).

Other examples of systems where packets or frames of information may be classified according to detected transmission errors in a received frame include radio communication systems such as that described in the Third Generation Partnership Project (3GPP) series of specifications for a so-called third generation public land mobile radio system (PLMN).

Objective processes for the purpose of measuring the perceived quality of a signal are currently under development and are of application in equipment development, equipment testing, and evaluation of system performance.

A number of patents and applications relate to this field, for example, European Patent 0647375, granted on 14th Oct. 1998. In this invention two initially identical copies of a test signal are used. The first copy is transmitted over a communications system under test. The resulting signal, which may have been degraded, is compared with a reference copy to identify audible errors in the degraded signal. These audible errors are assessed to determine their perceived significance—that is, errors that are considered significant by human listeners are given greater weight than those that are not considered so significant. In particular inaudible errors are irrelevant to perception and need not be assessed.

This system provides an output comparable to subjective quality measures originally devised for use by human subjects. More specifically, it generates two values, $Y_{LE}$ and $Y_{LQ}$, equivalent to the "Mean Opinion Scores" (MOS) for "listening effort" and "listening quality", which would be given by a panel of human listeners when listening to the same signal. The use of an automated system allows for more consistent assessment than human assessors could achieve, and also allows the use of compressed and simplified test sequences, which give spurious results when used with human assessors because such sequences do not convey intelligible content.

In the patent specification referred to above, an auditory transform of each signal is taken, to emulate the response of the human auditory system (ear and brain) to sound. The degraded signal is then compared with the reference signal after each has been transformed such that the subjective quality that would be perceived by a listener using the network is determined from parameters extracted from the transforms.

Such automated systems require a known (reference) signal to be played through a distorting system (the communications network or other system under test) to derive a degraded signal, which is compared with an undistorted version of the reference signal. Such systems are known as "intrusive" measurement systems, because whilst the test is carried out the channel under test cannot, in general, carry live traffic.

Measurement systems that do not require a reference signal are known as "non-intrusive". A description of such a system is provided in the literature (Non-intrusive speech quality assessment using vocal-tract models, Gray P.; Hollier M. P.; and Massara. R. E.; IEE Proceedings—Vision, Image and Signal Processing, 147 (6), 493–501, December 2000.). Such systems are not, in general, as accurate as intrusive measurement systems but have the advantage that they can be used on revenue earning traffic.

German patent application DE 4324292 discloses the measurement of a bit error rate (BER) over a period of time, the formation of a statistical representation therefrom, and the use of a transform to map the statistical representation to a measure of the speech quality of a digital mobile radio system. The invention is characterised by the fact that the mapping is derived from the results of subjective experiments. The application discloses the derivation of speech quality based on the analysis of BER and the use of the mean, standard deviation and probability distribution of a plurality of bit error measurements. Patent application DE 4324292 does not describe the use of a frame classification algorithm. The only specific means of generating the required bit error information described in the embodiment and claims of DE 4324292 is the RXQUAL parameter produced by GSM systems. RXQUAL is a coarse estimate of BER prior to channel decoding measured over a period of 480 ms (in other words the raw BER). However, it is known that the ability of a FEC decoder to correct errors depends on the bit-by-bit burst characteristics of the raw errors. Such detailed burst information is lost in the averaging over 10,944 bits performed in the RXQUAL calculation, and the embodiment described in DE 4324292 is unlikely to provide a reliable estimate of speech quality across a wide range of radio propagation conditions. This conclusion is confirmed in the literature (Radio link parameter based speech quality index-SQI; Karlsson, A.; Heikkila, G.; Minde, T. B.; Nordlund, M.; Timus, B.; Wiren, N; Proceedings of ICECS '99. The 6th IEEE International Conference on Electronics, Circuits and Systems, Volume: 3, 1999 Page(s): 1569–1572 vol. 3).

US patent application U.S. Pat. No. 6,157,830 discloses an arrangement whereby radio link parameters are converted into a set of temporal parameters that are combined to yield a set of correlated parameters that are in turn mapped into a speech quality measure by means of an estimator. This patent discloses the derivation of temporal parameters from measures of raw BER over 0.5 second intervals, the mean frame erasure rate calculated over a 5 second interval and the calculation of the number of consecutive frame erasures in a 5 second interval. The patent goes on to disclose the statistical analysis of the temporal parameters, providing maximum value, minimum value, mean value, standard deviation, skewness, and kurtosis as examples.

International patent application WO 01/97414 describes a method of determining the perceived quality of a speech transmission system by using a measure of link quality to retrieve a previously stored perceived quality score calculated for the same link quality. The pre-calculation of the perceived quality score for a given link quality is performed by: 1) using a description of the link quality to degrade a copy of a test signal; 2) deriving the corresponding perceived quality score by using an intrusive objective speech quality measurement algorithm to compare the degraded version of the test signal with an undegraded version. WO 01/97414 discloses that bit error rate, packet delay variation, and packet loss characteristics (number of packets lost and any pattern to them) are suitable measures of the link quality for mapping to a perceived quality score, but does not provide any specific description of statistical representations of these parameters.

BRIEF SUMMARY OF THE INVENTION

The present invention provides improvements over the above discussed prior art techniques by providing a condensed means of representing a statistical representation of transmission error characteristics in a form that retains sufficient information to derive therefrom a useful estimate of the perceived quality provided by the channel under test. The present invention has applications in, but not limited to, perceived quality measurement systems where transmission error information must be either stored in limited memory, for example in an IP gateway or IP telephone, or transmitted over a very limited bandwidth, for example in a signalling message between an IP gateway and an IP gatekeeper. The invention has the advantage that the number of symbols required to store the final statistical representation can be independent of the number of frames used to generate the statistical representation, and hence the time period over which the channel is measured. The scope of the present invention includes, but is not limited to, the transmission of speech, audio and/or video signals for the purposes of two-way communication and/or one way streaming.

According to the invention there is provided a method of measuring the transmission error characteristics of a channel employing frame based transmission, in which a frame classification indicator is generated for an expected frame, according to data received via said channel, comprising the steps of a) generating frame classification data relating to the expected frame; and b) updating a statistical representation of the transmission error characteristics according to said frame classification data, wherein steps a) and b) are performed at least twice.

Preferably the generating step provides said frame classification data according to whether the frame or part thereof has been discarded, which may be determined from the frame classification indicator.

In an alternative embodiment the generating step provides said frame classification data according to detected errors in a successfully received frame or the probability of symbol errors in a successfully received frame.

The frame may comprise symbols which are divided into one or more classes and in which the statistical representation comprises a first set of one or more members, each member of the first set relating to errors occurring in an associated class. The errors may be represented by a sample distribution representing the distribution of the number of symbol errors occurring in the class associated with said member. The errors may also be represented using a rate factor corresponding to the number or proportion of symbols errors in the class associated with said member.

Ideally the frame classification data comprises one of a plurality of possible classifications and the statistical representation comprises a second set of one or more members, each member of the second set relating to an associated classification.

In a preferred embodiment the classifications are represented using a sample distribution, therefore a member of the second set comprises a sample distribution representing the distribution of the number of consecutive frames which are classified as having the frame classification associated with said sample distribution and in which said frame classification is used to update the sample distribution of the second set related to said frame classification. The classifications may also be represented using a rate factor corresponding to the proportion of frames which are classified as having the frame classification associated with said member.

The frame classification may be a binary classification relating to the frame classification indicator according to whether the frame has been received successfully or not, It is an advantage if the method further comprises the step of generating a compressed statistical representation in dependence upon said statistical representation. The compressed statistical representation may be generated using normalisation or quantisation or by using a lossless compression technique, for example.

According to another aspect of the invention there is provided a method of measuring perceived transmission performance of a communications channel comprising the steps of measuring transmission error characteristics using a method described previously using sample distributions to represent frame classifications or symbol error; generating the perceived transmission performance according to the transmission error characteristics, in which the perceived transmission error characteristics are generated by generating a weighted sum of the value of one or more bins of one or more of the sample distributions, and in which weights applied to a sample distribution bin value are optimised for a particular signal decoder and associated error concealment algorithm.

According to another aspect of the invention there is also provided a method of measuring perceived transmission performance of a communications channel comprising the steps of measuring transmission error characteristics as described previously; and generating the perceived transmission performance according to the transmission error characteristics.

In one preferred embodiment the generating step comprises the sub steps of degrading a test data sequence according to said transmission error characteristics to provide a degraded test data sequence; and generating the perceived transmission performance according to said degraded test data sequence. Preferably the generating sub step comprises the sub step of comparing the test data sequence with the degraded test data sequence.

In a second preferred embodiment the generating step comprises the sub step of retrieving a pre-calculated measure of perceived transmission performance from a store relating measures of perceived transmission performance to statistical representations of transmission error characteristics.

According to a further aspect of the invention there is provided an apparatus for measuring the transmission error characteristics of a channel employing a frame based transmission protocol in which a frame classification indicator is generated for an expected frame, comprising a classifier arranged to classify a frame in dependence upon said frame classification indicator to provide frame classification data;

means arranged to update a statistical representation of the transmission error characteristics according to said frame classification.

Advantageously the invention also comprises a generator arranged to generate a compressed statistical representation in dependence upon said statistical representation.

BRIEF DESCRIPTION OF SEVERAL VIEWS OF THE DRAWINGS

Embodiments of the invention will now be described, by way of example only, with reference to the accompany drawings in which.

Examples of sample distributions are provided in FIG. 3a and FIG. 3b.

DETAILED DESCRIPTION OF THE INVENTION

Figure 1:
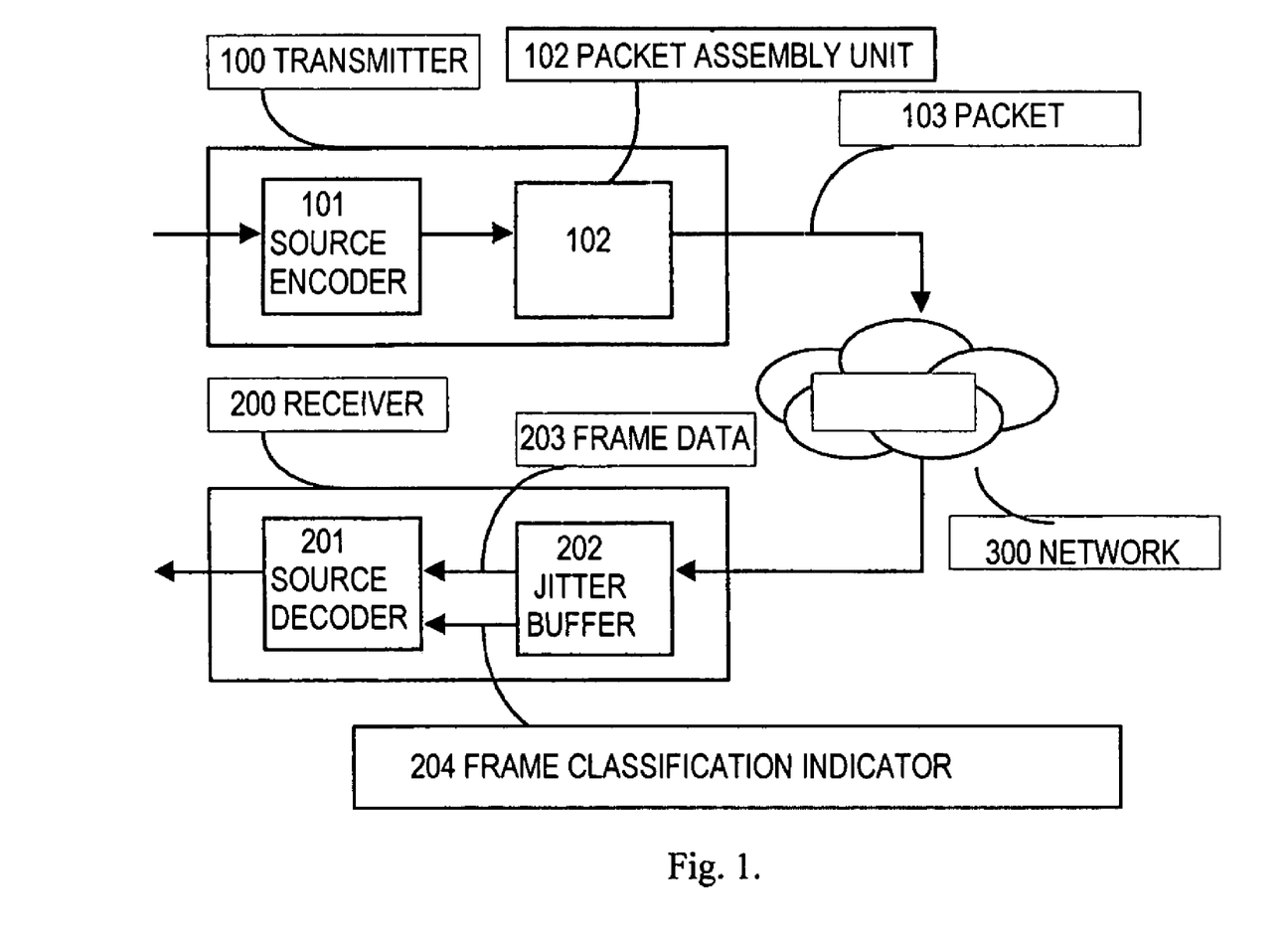
FIG. 1 is a block diagram illustrating a conventional transmitter and a receiver.

FIG. 1 illustrates a known packet communications system comprising a transmitter 100 and a receiver 200. A source encoder 101 encodes a signal into an encoded data sequence in order to reduce the data rate for a signal to be transmitted using appropriate compression techniques. The data is in the form of a sequence of symbols, which may be binary digits (bits), or may be other encoded symbols. A packet assembly unit 102 buffers sufficient data from the source encoder to provide the payload for a single packet 103. The packet assembly unit adds header information to the packet for transmission. In a typical IP communication system, this header information will comprise an IP header, a UDP header and an RTP header. Packets of data are transmitted to the receiver 200 via a packet network 300, which can reorder, delay or discard them.

At the receiver, a jitter buffer 202 uses sequence number information to ensure that packets are passed to a source decoder 201 in the correct order. The jitter buffer 202 uses timestamp information to determine when frames of data 203 extracted from packets should be passed to the source decoder 201. The jitter buffer 202 also produces a classification 204 for each frame that is passed to the source decoder 201.

In a fixed-rate system, the frame classification indicator 204 may be a simple binary flag to indicate whether useful data was received for that frame or not. Reasons for declaring a frame as unusable include, but are not limited to:

the frame being discarded at a preceding point in the transmission system;

the frame arriving too late to be of use;

the frame containing detected errors;

the detected probability of errors.

Methods for performing this classification include, but are not limited to using:

sequence numbers;

timestamp information;

checksums;

residual error information;

information from a Viterbi channel decoder.

In a variable rate system, the frame classification 204 will further indicate the rate at which the signal was encoded; in a layered system, the frame classification indicator 204 will further indicate the number of layers received. Finally, the source decoder 201 uses the frame classification indicator 204 and any available data 203 to reconstruct a version of the original signal.

The signal at the output of the source decoder 201 will differ from the original signal at the input to the source encoder 101 if the source coding process is lossy or if packets of information are missing. The present invention is based on the observation that the perceived quality of the transmission is dependent upon the statistical behaviour of the frame classification.

Figure 2:
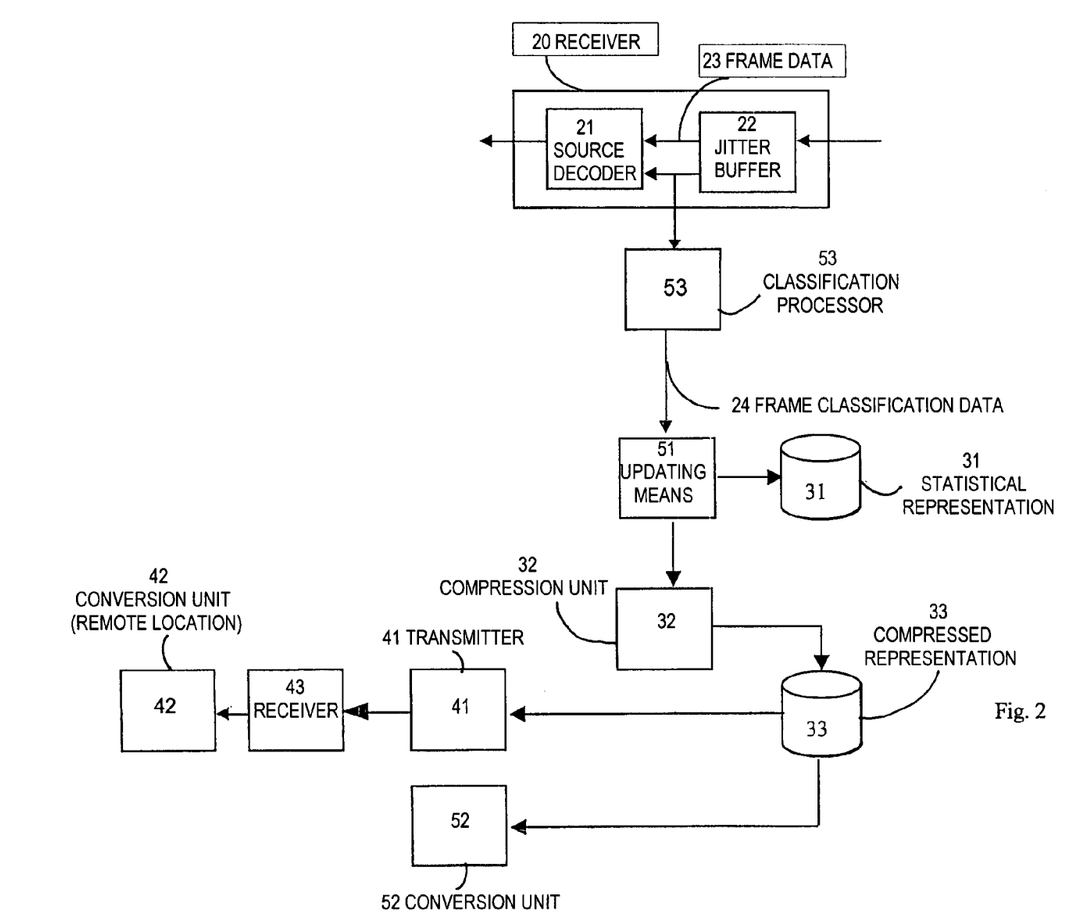
FIG. 2 is a block diagram illustrating apparatus for measuring channel transmission accuracy.

FIG. 2 depicts an apparatus for measuring the perceived quality of a communications channel exemplified by that depicted in FIG. 1. The apparatus is located in a receiver 20, such as an IP gateway or IP telephone, comprising a jitter buffer 22 and a source decoder 21. A frame classification indicator 204 is given to each frame of data which is expected (i.e. should have been received), whether or not any data has actually successfully been received The frame classification indicator 204 given to each frame of data by the jitter buffer 22 is used by a classification processor 53 to provide frame classification data 24. The frame classification data 24 is used by updating means 51 to update a statistical representation 31 of the transmission error characteristics. The frame classification data 24 may be the same as the frame classification indicator 204 or a derivative thereof. Alternatively, the frame classification data may be derived from the number of detected errors in a successfully received frame, or a dedicated frame classification mechanism may be used.

At the end of a sampling period, the statistical representation 31 is converted into a compressed representation 33 by a compression unit 32. The compressed representation 33 may be stored in memory prior to conversion to a measure of the perceived quality of the link by unit 52. Alternatively the compressed representation may be sent by a transmitter 41 to a receiver 43 for conversion to a measure of perceived quality at a remote location by unit 42.

Figure 3A:
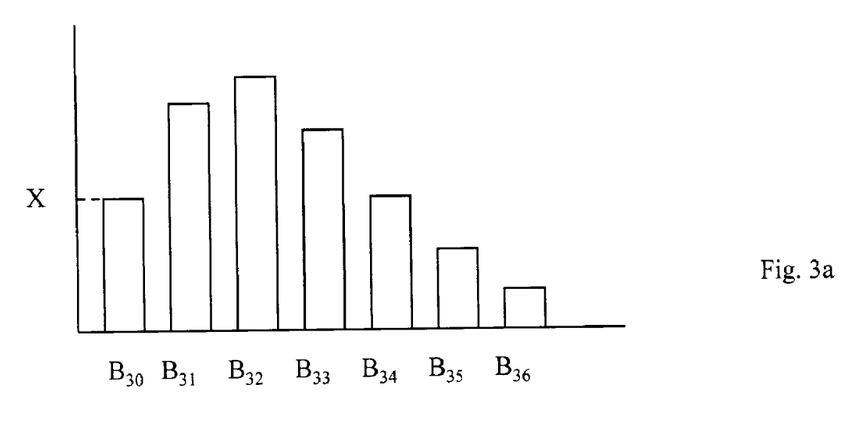

In the preferred embodiment of the invention, the statistical representation comprises sample distributions, which are known to those skilled in the art of statistics. An example of samples observed in class 3 having K symbol errors (bin $B_{3,6}$, representing the number of samples observed in class 3 having 6 or more symbol errors) then it can be seen that X samples have been observed in class 3 having 0 symbol errors.

The statistical representation of the transmission error characteristics is formed by the set of one or more sample distributions $\{E_1, E_2, \ldots, E_M\}$ where the symbols in the frame are divided into M classes.

The statistical representation may have an associated rate factor, the rate factor may comprise $N_J$, the number of residual symbol errors observed in class J, $N_{TOTAL}$, the total number of error classification symbol sequences observed, or a proportion $N_J/N_{TOTAL}$ (i.e. the symbol error rate for class J). of a sample distribution is provided in FIG. 3.

Each value in a sample distribution is called a bin, and records the number of samples observed with a value in a particular range. The set of bins that form a sample distribution should collectively represent all possible samples values that will be observed.

In a preferred embodiment the statistical representation comprises a set of one or more sample distributions, each sample distribution relating to a particular frame classification. In the following discussion, each frame used to update a sample distribution is referred to as a 'sample'.

The frame characterisation L calculated for a sample is used to update a corresponding sample distribution $F_L$ comprising bins $\{B_{L,1}, B_{L,2}, B_{L,3}, \ldots\}$. The value of bin $B_{L,K}$ represents the number of runs of C consecutive samples classified as type L; where C lies within the range associated with the $K^{th}$ bin of the distribution. Since the maximum length of a run of samples is unlimited, it is preferable for one bin to represent the number of runs exceeding a particular length. In this embodiment of the invention the statistical representation of the transmission error characteristics comprises one or more sample distributions $\{F_1, F_2, \ldots\}$. The statistical representation 31 is updated by the updating means 51 at the end of each run of frames with the same classification.

Figure 3B:
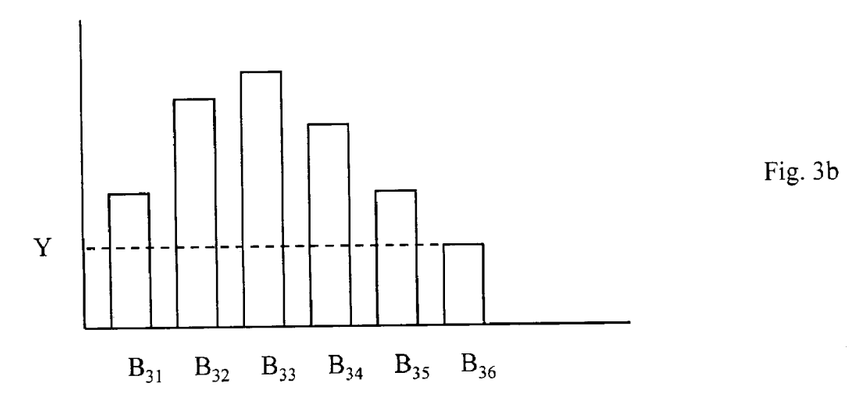

For example, if the sample distribution of FIG. 3b represents sample distribution $F_3$, and assuming each bin $B_{3,K}$, represents the number occurrences of K consecutive samples (bin $B_{3,6}$, representing the number of occurrences of 6 or more consecutive samples in class 3) then it can be seen that there have been y occurrences of 6 consecutive samples having a frame classification of 3. Note, there is no bin for 0 consecutive samples.

In a special case of the above, sampled frames are classified using a binary bad/good frame decision. In this case, the characterisation of the link quality is formed by the set of the sample distributions $F_1$ and $F_2$, which record the length of runs of consecutive bad and consecutive good frames, respectively.

The statistical representation may also comprise a rate factor which is related the frame classification. The rate factor may comprise $N_L$, the number of sampled frames with a classification L, $N_{TOTAL}$, the total number of frames sampled, or the proportion $N_L/N_{TOTAL}$.

The statistical representation may not include sample distributions for all possible frame classifications, and a rate factor may be provided as well as or instead of a particular sample distribution.

For example, a statistical representation may include a sample distribution $F_1$, which records the length of runs of consecutive bad frames and a factor $R_1$, the bad frame rate. In another embodiment the statistical representation may include a sample distribution $F_1$, which records the length of runs of consecutive bad frames and a factor $R_2$, the good frame rate.

According to an alternative embodiment of the invention, frames are characterised according to the detected or predicted symbol errors in a particular FEC symbol class. A classification value generated for FEC symbol class J of a sample is used to update a corresponding sample distribution $E_J$ comprising bins $\{B_{J,1}, B_{J,2}, B_{J,3}, \ldots\}$. The value of bin $B_{J,K}$ represents the number of frames observed with S symbol errors in class J; where S lies within the range associated with the $K^{th}$ bin of the distribution. For example, if the sample distribution of FIG. 3a represents sample distribution $E_3$, and assuming each bin $B_{3,K}$, represents the number.

Therefore, the statistical representation, according to the invention may comprise one or more sample distributions for the number of residual errors in different FEC classes $\{E_1, E_2, \ldots\}$, one or more sample distributions for the length of runs of consecutive frames with the same classification $\{F_1, F_2, \ldots\}$, and one or more frame classification rate factors $\{R_1, R_2, \ldots\}$.

While designing a sample distribution, it is desirable to provide sufficient symbols to represent all possible values of each bin. However, once the link quality measurement is complete, it may be useful to reduce the total number of symbols required to store the distributions and rate factors that constitute the characterisation of the link quality. Distributions can be normalised by scaling all of the bin values by a common factor. If the scaling factor is proportional to the number of samples observed, the normalised distribution is said to be a frequency distribution. The advantage of normalizing a distribution prior to storage or transmission is that bin values can be limited to a maximum value, and therefore the number of symbols required to represent each bin is independent of the original number of samples. If the bins constituting a sample distribution are considered as a vector, it will be clear to a person skilled in the art of signal processing that vector quantisation techniques can be used to reduce the number of symbols required to represent a distribution. Similarly, scalar quantisation techniques can be used to reduce the number of symbols required to represent a rate factor. It should be noted that, by its definition, the process of quantisation introduces errors into the value or values of the scalar or vector being quantised. An alternative method of data reduction would be the use of one of many well-known lossless data compression techniques.

Hence, in an additional arrangement of the invention, means are provided to reduce the number of symbols required to represent a link quality measure of the type described in one of the preceding arrangements of the invention. The reduction means may include, but is not limited to, a combination of one or more of the following techniques:

normalising one or more distributions;

applying vector quantisation techniques to one or more distributions;

applying lossless data compression techniques to one or more distributions;

applying scalar quantisation techniques to one or more rate factors.

Four methods are now described for generating a measure of perceived transmission performance from the statistical representation of the transmission error characteristics described above.

According to a first method, the statistical representation of link quality is directly mapped to a measure of the perceived transmission quality of the channel. An example of this would be a weighted sum of the bins of the set of sample distributions $\{F_1, F_2, \ldots\}$ and rate factors $\{R_1, R_2, \ldots\}$, if used. Hence, a measure of perceived transmission quality M can be defined as:

$$M = a_{1,1}B_{1,1} + a_{1,2}B_{1,2} + \ldots + a_{1,N}B_{1,N} + a_{2,1}B_{2,1} + a_{2,2}B_{2,2} + \ldots +$$

$$a_{2,N}B_{2,N} + \ldots + a_{M,1}B_{M,1} + a_{M,2}B_{M,2} + \ldots a_{M,N}B_{M,N} +$$

-continued $$b_1 R_1 + b_2 R_2 \ldots$$

where $a_{i,j}$ is a weight, $b_i$ is a weight, $B_{i,j}$ is the jth bin of sample distribution $F_i$, N is the number of bins in each distribution and M is the number of distributions.

A feature of this method is that the set of weights $\{a_{1,1}, \ldots a_{M,N}, b_1, b_2, \ldots\}$ can be optimised for a particular signal decoder and associated error concealment algorithm.

One method for optimising the set of weights is the application of linear regression using a training set generated according to the methods described in WO 01/97414.

Other methods of mapping include, but are not limited to, non-linear mappings, neural networks, radial basis function networks, estimators and pattern recognition techniques.

Means for directly mapping radio link parameters to perceived quality are described in U.S. Pat. No. 6,1578,30. The present invention would provide an enhancement to this scheme by providing a specific means of producing a compact representation of the link quality information.

According to a second method, the statistical representation of the link quality is used to retrieve a pre-calculated measure of perceived transmission quality. Means for such retrieval are described in German patent application DE 4324292 and International patent application WO 01/97414. The present invention provides enhancements to these two schemes by providing a specific means of producing a compact statistical representation of transmission error characteristics.

According to a third method, the statistical representation of transmission error characteristics is used to degrade a copy of a test signal. In the case of a speech transmission system, this signal would be speech or a test signal representing the main components of human speech, such as that described in European patent application EP0705501. In the case of a video transmission system the test signal would be a sequence of still or moving images. The perceived transmission quality of the communication system is derived by comparing the degraded test signal and an undegraded copy using an intrusive measurement system such as that described in European Patent 0647375, granted on $14^{th}$ Oct. 1998.

In a fourth method which is a variation of the third method, the statistical representation of transmission error characteristics is used to degrade a copy of a test signal. The perceived transmission quality of the communication system is derived directly from the degraded test signal using a non-intrusive measurement system, such as that described in "Non-intrusive speech quality assessment using vocal-tract models, Gray P.; Hollier M. P.; and Massara. R. E.; IEE Proceedings—Vision, Image and Signal Processing, 147 (6), 493–501, December 2000."

The present invention has been described with reference to a packet transmission system, such as, but not limited to, an IP network. It will be clear to those skilled in the art that the method and apparatus described in the patent application can be used to measure the perceived transmission quality of any communication system characterised by frames of data being passed to a signal decoder with a classification related to the validity of the data and/or its rate.

The invention claimed is:

1. A method of measuring the transmission error characteristics of a channel employing frame based transmission, in which a frame classification indicator is generated for an expected frame, according to data received via said channel, comprising the steps of
    a) generating frame classification data relating to the expected frame; and
    b) updating a statistical representation of the transmission error characteristics according to said frame classification data, wherein steps a) and b) are performed at least twice,
    in which the frame classification data comprises one of a plurality of possible classifications and said statistical representation comprises a first set of one or more members, each member of the first set relating to an associated classification; and
    a member of the first set comprises a sample distribution representing the distribution of the number of consecutive frames which are classified as having the frame classification associated with said sample distribution and in which said frame classification is used to update the sample distribution of the first set related to said frame classification.

2. A method according to claim 1, in which the generating step provides said frame classification data according to whether the frame or part thereof has been discarded.

3. A method according to claim 1, in which the generating step provides said frame classification data according to detected errors in a successfully received frame.

4. A method according to claim 3, in which a frame comprises symbols which are divided into one or more classes and in which the statistical representation comprises a second set of one or more members, each member of the second set relating to errors occurring in an associated class.

5. A method according to claim 4, in which a member of the second set comprises a sample distribution representing the distribution of the number of symbol errors occurring in the class associated with said member.

6. A method according to claim 5, in which a member of the second set comprises a rate factor corresponding to the number or proportion of symbols errors in the class associated with said member.

7. A method of measuring perceived transmission performance of a communications channel comprising the steps of
    measuring transmission error characteristics according to the method of claim 4;
    generating the perceived transmission performance according to the transmission error characteristics,
    in which the perceived transmission error characteristics are generated by generating a weighted sum of the value of one or more bins of one or more of the sample distributions, and in which weights applied to a sample distribution bin value are optimised for a particular signal decoder and associated error concealment algorithm.

8. A method according to claim 1, in which the generating step provides said frame classification data according to the probability of errors in a successfully received frame.

9. A method according to claim 1, in which a member of the first set comprises a rate factor corresponding to the number or proportion of frames which are classified as having the classification associated with said member.

10. A method according to claim 1, in which the classification is a binary classification according to whether the frame has been received successfully.

11. A method according to claim 1, further comprising the step of
    generating a compressed statistical representation in dependence upon said statistical representation.

12. A method of measuring perceived transmission performance of a communications channel comprising the steps of
    measuring transmission error characteristics according to the method of claim 1; and
    generating the perceived transmission performance according to the transmission error characteristics.

13. A method according to claim 12, in which the generating step comprises the sub steps of
    degrading a test data sequence according to said transmission error characteristics to provide a degraded test data sequence; and
    generating the perceived transmission performance according to said degraded test data sequence.

14. A method according to claim 13, in which the generating sub step comprises the sub step of comparing the test data sequence with the degraded test data sequence.

15. A method according to claim 12, in which the generating step comprises the sub step of
    retrieving a pre-calculated measure of perceived transmission performance from a store relating measures of perceived transmission performance to statistical representations of transmission error characteristics.

16. A method of measuring perceived transmission performance of a communications channel comprising the steps of
    measuring transmission error characteristics according to the method of claim 1; and
    generating the perceived transmission performance according to the transmission error characteristics,
    in which the perceived transmission error characteristics are generated by generating a weighted sum of the value of one or more bins of one or more of the sample distributions, and in which weights applied to a sample distribution bin value are optimised for a particular signal decoder and associated error concealment algorithm.

17. An apparatus for measuring the transmission error characteristics of a channel employing a frame based transmission protocol in which a frame classification indicator is generated for an expected frame, comprising
    a classifier arranged to classify a frame in dependence upon said frame classification indicator to provide frame classification data;
    means arranged to update a statistical representation of the transmission error characteristics according to said frame classification;
    wherein the frame classification indicator comprises one of a plurality of possible classifications and said statistical representation comprises a first set of one or more members each member of the first set relating to an associated classification; and
    a member of the first set comprises a sample distribution representing the distribution of the number of consecutive frames which are classified as having the frame classification associated with said sample distribution and in which said frame classification is used to update the sample distribution of the first set related to said frame classification.

18. An apparatus according to claim 17, further comprising a generator arranged to generate a compressed statistical representation in dependence upon said statistical representation.

* * * * *